United States Patent
Kojima

(10) Patent No.: US 10,487,903 B2
(45) Date of Patent: Nov. 26, 2019

(54) METHOD FOR MANUFACTURING VIBRATION DAMPING DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 149 days.

(21) Appl. No.: 15/561,592

(22) PCT Filed: Feb. 2, 2016

(86) PCT No.: PCT/JP2016/053008
§ 371 (c)(1),
(2) Date: Sep. 26, 2017

(87) PCT Pub. No.: WO2016/157991
PCT Pub. Date: Oct. 6, 2016

(65) Prior Publication Data
US 2018/0066725 A1    Mar. 8, 2018

(30) Foreign Application Priority Data
Mar. 31, 2015   (JP) ................... 2015-073473

(51) Int. Cl.
*F16F 9/43*    (2006.01)
*F16F 13/10*   (2006.01)
*F16F 9/32*    (2006.01)

(52) U.S. Cl.
CPC ............ *F16F 9/435* (2013.01); *F16F 9/3271* (2013.01); *F16F 13/10* (2013.01); *F16F 13/103* (2013.01);
(Continued)

(58) Field of Classification Search
CPC ........ F16F 9/435; F16F 13/103; F16F 9/3271; F16F 13/10; F16F 2230/06;
(Continued)

(56) References Cited

U.S. PATENT DOCUMENTS 8,407,897 B2    4/2013   Ueki
2011/0192030 A1   8/2011   Ueki

FOREIGN PATENT DOCUMENTS

CN    102165215 A    8/2011
JP      6159033 A    3/1986
(Continued)

OTHER PUBLICATIONS

English translation of JP H11-125297 (Year: 1999).*
(Continued)

*Primary Examiner* — Jun S Yoo
(74) *Attorney, Agent, or Firm* — Sughrue Mion, PLLC

(57) ABSTRACT

Provided is a method for manufacturing a vibration damping device including sealing liquid (L) in a liquid chamber (11) of a vibration damping device main body (10) having the liquid chamber (11) in which the liquid (L) is sealed, and an injection port (12) through which the liquid (L) is injected into the liquid chamber (11). In a state where a nozzle (22) spouting the liquid (L) is thrust into the injection port (12) and an inside of a decompression container (21) having the vibration damping device main body (10) disposed therein is decompressed, the liquid (L) is injected into the liquid chamber (11) through the nozzle (22), and air inside the liquid chamber (11) is discharged through an air discharge port (14) which is formed in the vibration damping device main body (10) and communicates with the liquid chamber (11).

13 Claims, 3 Drawing Sheets

(52) U.S. Cl.
CPC ....... *F16F 2224/04* (2013.01); *F16F 2226/04* (2013.01); *F16F 2230/06* (2013.01)

(58) Field of Classification Search
CPC ...... F16F 2226/04; F16F 2224/04; F16F 9/10; F16F 9/43; F16F 13/06
See application file for complete search history.

(56) References Cited

FOREIGN PATENT DOCUMENTS

| | | | |
|---|---|---|---|
| JP | 63-152743 | A | 6/1988 |
| JP | 4-282042 | A | 10/1992 |
| JP | 11-125297 | A | 5/1999 |
| JP | 2002-61701 | A | 2/2002 |
| JP | 2003194136 | A | 7/2003 |
| JP | 2009-068639 | A | 4/2009 |
| JP | 2010255651 | A | 11/2010 |

OTHER PUBLICATIONS

English translation of JP 2009068639 (Year: 2009).*
Communication dated Mar. 20, 2018 from the European Patent Office in corresponding application No. 16771875.8.
International Search Report for PCT/JP2016/053008 dated Mar. 15, 2016.
Communication dated Aug. 31, 2018 from the State Intellectual Property Office of the P.R.C. in counterpart Chinese application No. 201680017893.8.

* cited by examiner

METHOD FOR MANUFACTURING VIBRATION DAMPING DEVICE

TECHNICAL FIELD

The present invention relates to a method for manufacturing a vibration damping device having a liquid chamber in which liquid is sealed.

This application is a National Stage of International Application No. PCT/JP2016/053008 filed Feb. 2, 2016, claiming priority based on Japanese Patent Application No. 2015-073473 filed Mar. 31, 2015, the contents of all of which are incorporated herein by reference in their entirety.

BACKGROUND ART

For example, Patent Document 1 discloses a known method as a method for manufacturing a vibration damping device of this kind. In this method, a vibration damping device is manufactured by sealing liquid in a liquid chamber of a vibration damping device main body having the liquid chamber and an injection port through which the liquid is injected into the liquid chamber.

CITATION LIST

Patent Document

[Patent Document 1] Japanese Unexamined Patent Application, First Publication No. H11-125297

SUMMARY OF INVENTION

Technical Problem

However, in methods for manufacturing vibration damping device in the related art, for example, even after liquid is injected into a liquid chamber such as a case where high-viscosity liquid is sealed, air sometimes remains side the liquid chamber.

The present invention has been made in consideration of the foregoing circumstances and an object thereof is to prevent the remains of air inside a liquid chamber and to seal liquid inside the liquid chamber.

Solution to Problem

In order to solve the foregoing problem present invention proposes means as follows.

According to a first aspect of the present invention, there is provided a method for manufacturing vibration damping device including sealing liquid in a liquid chamber of a vibration damping device main body having the liquid chamber in which the liquid is sealed, and an injection port through which the liquid is injected into the liquid chamber. In a state where a nozzle spouting the liquid is thrust into the injection port and an inside of a decompression container having the vibration damping device main body disposed therein decompressed, the liquid is injected into the liquid chamber through the nozzle, and air inside the liquid chamber is discharged through an air discharge port which is formed in the vibration damping device main body and communicates with the liquid chamber.

Advantageous Effects of Invention

According to the method for manufacturing a vibration damping device of the present invention, it is possible to prevent the remains of air inside the liquid chamber and to seal liquid inside the liquid chamber.

DESCRIPTION OF EMBODIMENTS

First Embodiment

Hereinafter, with reference to FIGS. 1 and 2, a method for manufacturing a vibration damping device according to a first embodiment of the present invention will be described. Examples of the vibration damping device include an engine mount or a bush for vehicles, a generator mount loaded in construction machinery, and machinery mounts installed in factories.

As illustrated n the method for manufacturing a vibration damping device, a vibration damping device is manufactured by sealing liquid L in a liquid chamber 11 of a vibration damping device main body 10 having the liquid chamber 11 in which the liquid L is sealed, and an injection port 12 through which the d L is injected into the liquid chamber 11. The vibration damping device main body 10 further includes an outer shell portion 13 (outer cylinder) forming the liquid chamber 11. The outer shell portion 13 forms the outer surface of the vibration damping device main body 10 and is exposed to the outside. The injection port 12 penetrates the outer shell portion 13 so that the inside of the liquid chamber 11 is directly connected to the outside.

As the liquid L, in the vibration damping device, liquid L, having high viscosity (for example, 500 cSt ($5\times10^{-4}$ $m^2$/s) or higher) can be preferably used. Examples of liquid L of such a type include silicone oil, ethylene glycol, and fluorine oil.

Figure 1:
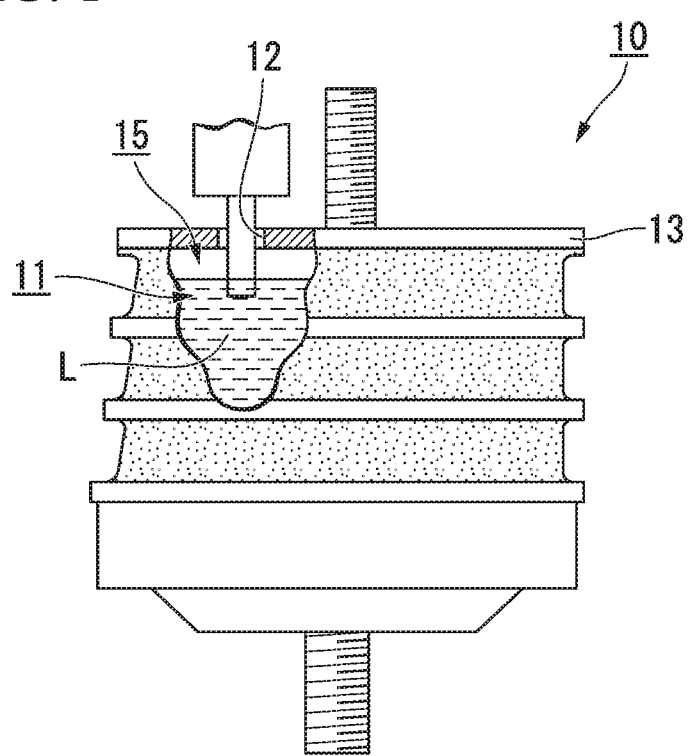
FIG. 1 is a view describing a method for manufacturing a vibration damping device according to a first embodiment of the present invention.

In this manufacturing method, first, as illustrated in FIG. 1, before the vibration damping device main body 10 is disposed inside a decompression container 21 (will be described below), a preliminary injection step in which the liquid L is partially injected into the liquid chamber 11 is executed.

In this case, for example, in a state where air inside the liquid chamber 11 is suctioned out and the inside of the liquid chamber 11 is decompressed, the liquid L may be injected into the liquid chamber 11.

Figure 2:
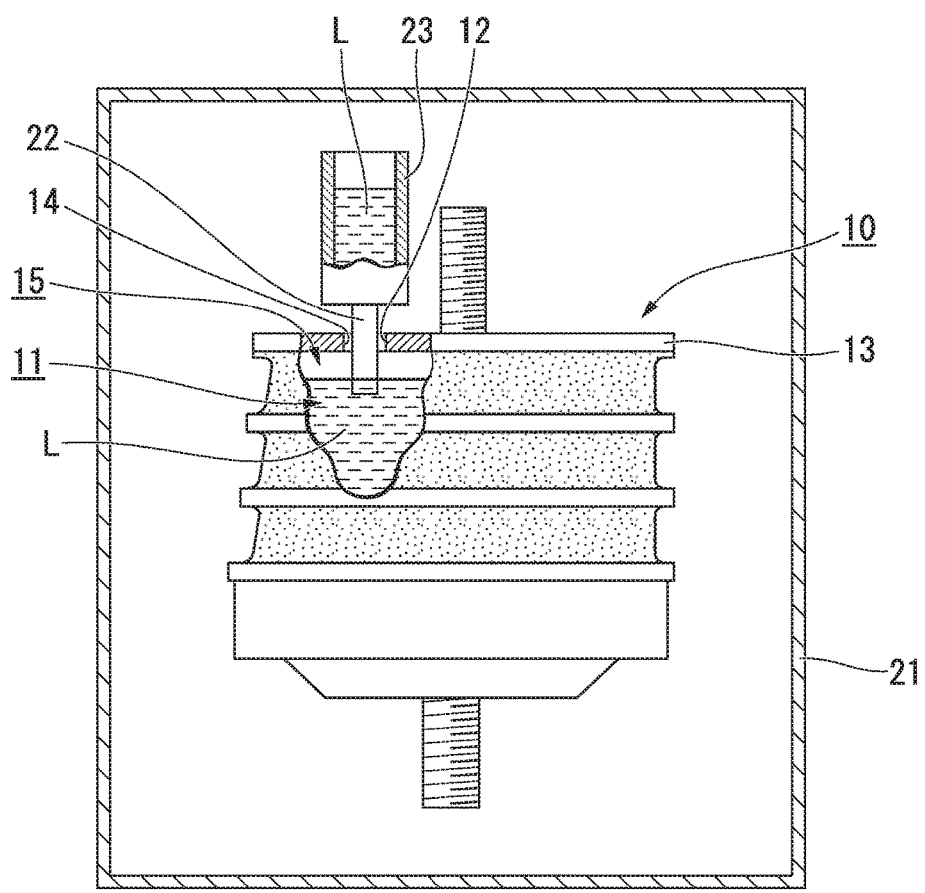
FIG. 2 is a view describing the method for manufacturing a vibration damping device illustrated in FIG. 1.

Next, as illustrated in FIG. 2, the vibration damping device main body 10 is disposed inside the decompression container 21, and a nozzle 22 spouting the liquid L is thrust into the injection port 12. Then, a main injection step in which the liquid L is injected into the liquid chamber 11 through the nozzle 22 is executed.

In the present embodiment, the nozzle 22 has a diameter smaller than the diameter of the injection port 12, and a clearance which directly connects the inside of the liquid chamber 1 and the outside (hereinafter, will be referred to as an "air discharge port 14") is provided between an outer circumferential surface of the nozzle 22 thrust into the injection port 12, and an inner circumferential surface of the injection port 12. When the vibration damping device main body 10 is disposed inside the decompression container 21, the vibration damping device main body 10 is disposed such that the injection port 12 and the air discharge port 14 are oriented vertically upward. As a result, a head-space 15 is formed above the liquid level of the liquid L inside the liquid chamber 11.

In addition, a liquid accommodation portion 23 which supplies the liquid to the nozzle 22 is connected to the nozzle 22. The inside of the liquid accommodation portion 23 can communicate with the inside of the decompression container 21 without passing through the nozzle 22 and directly leads to the inside of the decompression container 21.

In the main injection step, in a state where the nozzle 22 is thrust into the injection port 12 and the inside of the decompression container 21 is decompressed, the liquid L is injected into the liquid chamber 11 through the nozzle 22, and air inside the liquid chamber 11 is discharged through the air discharge port 14. In the present embodiment, in a state where the vibration damping device main body 10 is disposed inside the decompression container 21 and the nozzle 22 is thrust into the injection port 12, the inside of the decompression container 21 is decompressed to a vacuum state, for example. Then, while the degree of vacuum side the decompression container 21 increases, the liquid L is injected into the liquid chamber 11 through the nozzle 22, and air inside the liquid chamber 11 is vigorously discharged from the liquid chamber 11 through the air discharge port 14.

In the main injection step, the nozzle 22 may be thrust into the injection port 12 after the vibration damping device main body 10 is disposed inside the decompression container 21, or the vibration damping device main body 10 may be disposed inside the decompression container 21 after the nozzle 22 is thrust into the injection port 12. In this case, it is preferable that the nozzle 22 is thrust into the injection port 12 such that a tip end portion thereof is positioned in the liquid L in the liquid chamber 11.

Thereafter, the nozzle 22 is pulled out from the injection port 12, and a sealing step of sealing (blocking) the injection port 12 is executed. Then, a vibration damping device is manufactured.

As described above, according to the method tier manufacturing a vibration damping device of the embodiment, in a state where the nozzle 22 is thrust into the injection port 12 and the inside of the decompression container 21 is decompressed, the liquid L is injected into the liquid chamber 11 through the nozzle 22, and air inside the liquid chamber 11 is discharged through the air discharge port 14. Accordingly, the remains of air inside the liquid chamber 11 can be prevented, so that the liquid L can be sealed inside the liquid chamber 11.

In addition, the air discharge port 4 is the clearance provided between the outer circumferential surface of the nozzle 22 thrust into the injection port 12, and the inner circumferential surface of the injection port 12. Therefore, when the injection ort 12 is sealed after the liquid is injected and the nozzle 22 is pulled out from the injection port 12, the air discharge port 14 can be sealed together. Thus, it is possible to simplify the work.

Moreover, before the vibration damping device main body 10 disposed inside the decompression container 21, the liquid L is partially injected into the liquid chamber 11. Therefore, it is possible to reduce the total amount of the liquid L injected into the liquid chamber 11 from the inside of the decompression container 21.

When the inside of the decompression container 21 is decompressed, for example, in a case where air mains in a bubble state in the liquid L which has been injected into the liquid chamber 11, the inside of the decompression container 21 is decompressed, so that degassing of the liquid L can be carried out. Accordingly, the remains of air inside the liquid chamber 11 can be effectively prevented.

In addition, as in the present embodiment, when the main injection step is executed after the preliminary injection step, the nozzle 22 is thrust into the injection port 12 such that the tip end portion of the nozzle 22 is positioned inside the liquid L of the liquid chamber 11. Thereafter, the liquid L starts to be injected in the main injection step. Accordingly, air can be prevented from being incorporated into the liquid 1, in the liquid chamber 11.

Second Embodiment

Next, the method for manufacturing a vibration damping device according to a second embodiment of the present invention will be described with reference to FIG. 3.

In the second embodiment, the same reference signs gill be applied to the same portions of the configuration elements in the first embodiment. The description thereof will not be repeated and only the difference will be described.

Figure 3:
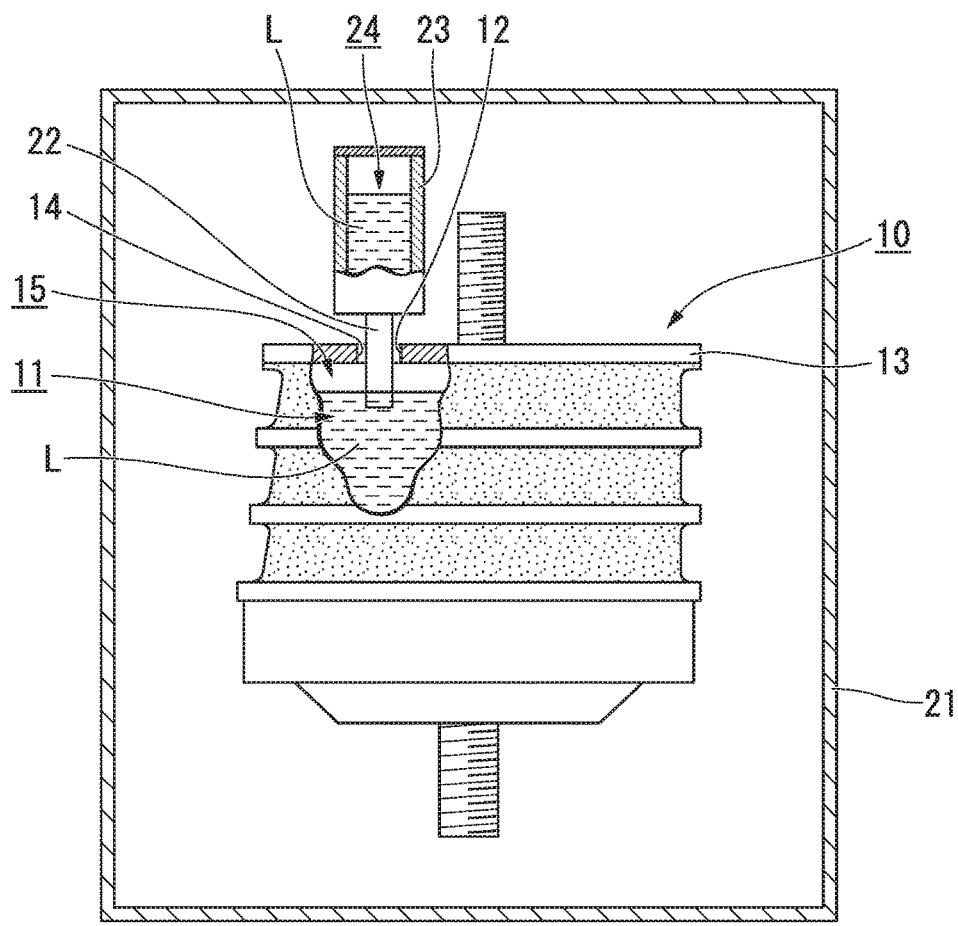
FIG. 3 is a view describing a method for manufacturing a vibration damping device according to a second embodiment of the present invention.

As illustrated in FIG. 3, in the hod for manufacturing a vibration damping device of the present embodiment, the inside of the liquid accommodation portion 23 communicates with the inside of the decompression container 21 through only the nozzle 22 and does not directly lead to the inside of the decompression container 21.

A space portion 24 is provided inside the liquid accommodation portion 23. Before the main injection step is executed, the pressure in the space portion 24 (internal pressure of the liquid accommodation portion 23) is equivalent to atmospheric pressure, for example.

Similar to the first embodiment, in the main injection step, in a state where the nozzle 22 is thrust into the injection port 12 and the inside of the decompression container 21 is decompressed, the liquid L is injected into the liquid chamber 11 through the nozzle 22, and air inside the liquid chamber 11 is discharged through the air discharge port 14. In this case, in the present embodiment, the internal pressure of the decompression container 21 is caused to be lower than the internal pressure of the liquid accommodation portion 23, the internal pressure of the liquid chamber 11 (pressure in the head-space 15) is caused to be lower than the internal pressure of the liquid accommodation portion 23 (pressure in the space portion 24).

Accordingly, the liquid L can be pressure-fed into the liquid chamber 11 through the nozzle 22 by utilizing the pressure difference between the internal pressure of the liquid chamber 11 and the internal pressure of the liquid accommodation portion 23. In this case, the decompression container 21 may be decompressed after the nozzle 22 is thrust into the injection port 12, or the nuzzle 22 may be thrust into the injection port 12 after the decompression container 21 is decompressed.

In the sealing step after the main injection step, in a state where the decompression state inside the decompression container 21 is maintained, the nozzle 22 is pulled out from the injection port 12. Thereafter, the injection port 12 is sealed, and then the vibration damping device is manufactured.

As described above, according to the method for manufacturing a vibration damping device of the embodiment, when the liquid L is injected into the liquid chamber 11 through the nozzle 22, the internal pressure of the decompression container 21 is caused to be lower than the internal pressure of the liquid accommodation portion 23, and the internal pressure of the liquid chamber 11 is caused to be lower than the internal pressure of the liquid accommodation portion 23. Therefore, based on the pressure difference between the internal pressure of the liquid chamber 11 and the internal pressure of the liquid accommodation portion 23, the liquid L inside the liquid accommodation portion 23 can be pressure-fed into the liquid chamber 11 through the nozzle 22. Therefore, a simple structure can be realized, and the remains of air inside the liquid chamber 11 can be effectively prevented.

In addition, after the liquid L is injected into the liquid chamber 11 through the nozzle 22, in a state where the decompression state inside the decompression container 21 is maintained, the nozzle 22 is pulled out from the injection port 12. Therefore, for example, when the decompression state inside the decompression container 21 is released, for example, when the inside of the decompression container 1 is exposed to the atmosphere, the liquid L inside the liquid chamber 11 can be prevented from flowing back to the liquid accommodation portion 23 through the nozzle 22.

The technical scope of the present invention is not limited to the embodiment described above, and various changes can be added without departing from the scope of the gist of the present invention.

For example, the preliminary injection step does not have to be executed. In the main injection step, the liquid L may be injected into the liquid chamber 11 in which no liquid has been injected.

In the embodiment, the air discharge port 14 serves as the clearance provided between the outer circumferential surface of the nozzle 22 and the inner circumferential surface of the injection port 12. However, the present invention is not limited thereto. For example, the air discharge port 14 may be provided independently from the injection port 12.

In addition, in the main injection step, for example, the liquid L may be injected into the liquid chamber 11 through the nozzle 22 by using a pressure feeding mechanism which pressure-feeds the liquid L utilizing an external force such as a hydraulic pressure cylinder.

Furthermore, without departing from the scope of the gist of the present invention, the configuration elements of the embodiment can be suitably replaced with known configuration elements. In addition, the modification example may be suitably combined.

INDUSTRIAL APPLICABILITY

According to the method for manufacturing a vibration damping device of the present invention, it is possible to prevent the remains of air inside a liquid chamber and to seal liquid inside the liquid chamber.

REFERENCE SIGNS LIST

10 VIBRATION DAMPING DEVICE MAIN BODY
11 LIQUID CHAMBER
12 INJECTION PORT
14 AIR DISCHARGE PORT
21 DECOMPRESSION CONTAINER
22 NOZZLE
23 LIQUID ACCOMMODATION PORTION
L LIQUID

The invention claimed is:
1. A method for manufacturing a vibration damping device comprising:
  sealing liquid in a liquid chamber of a vibration damping device main body having the liquid chamber in which the liquid is sealed, and an injection port through which the liquid is injected into the liquid chamber,
  wherein in a state where a nozzle spouting the liquid is thrust into the injection port and an inside of a decompression container having the vibration damping device main body disposed therein is decompressed, the liquid is injected into the liquid chamber through the nozzle, and air inside the liquid chamber is discharged through an air discharge port which is formed in the vibration damping device main body and communicates with the liquid chamber, and
  wherein a liquid accommodation portion which supplies the liquid to the nozzle is disposed in the decompression container when the liquid is injected into the liquid chamber through the nozzle.

2. The method for manufacturing a vibration damping device according to claim 1,
  wherein the nozzle has a diameter smaller than a diameter of the injection port, and
  wherein the air discharge port is a clearance provided between an outer circumferential surface of the nozzle thrust into the injection port and an inner circumferential surface of the injection port.

3. The method for manufacturing a vibration damping device according to claim 2,
  wherein when the liquid is injected into the liquid chamber through the nozzle, an internal pressure of the decompression container is caused to be lower than an internal pressure of the liquid accommodation portion.

4. The method for manufacturing a vibration damping device according to claim 3,
  wherein after the liquid is injected into the liquid chamber through the nozzle, the nozzle is pulled out from the injection port in a state where a decompression state inside the decompression container is maintained.

5. The method for manufacturing a vibration damping device according to claim 4,
  wherein before the vibration damping device main body is disposed inside the decompression container, the liquid is partially injected into the liquid chamber.

6. The method for manufacturing a vibration damping device according to claim 2,
  wherein before the vibration damping device main body is disposed inside the decompression container, the liquid is partially injected into the liquid chamber.

7. The method for manufacturing a vibration damping device according to claim 3,
  wherein before the vibration damping device main body is disposed inside the decompression container, the liquid is partially injected into the liquid chamber.

8. The method for manufacturing a vibration damping device according to claim 1,
  wherein when the liquid is injected into the liquid chamber through the nozzle, an internal pressure of the decompression container is caused to be lower than an internal pressure of the liquid accommodation portion.

9. The method for manufacturing a vibration damping device according to claim 8,
  wherein after the liquid is injected into the liquid chamber through the nozzle, the nozzle is pulled out from the injection port in a state where a decompression state inside the decompression container is maintained.

10. The method for manufacturing a vibration damping device according to claim 9,
  wherein before the vibration damping device main body is disposed inside the decompression container, the liquid is partially injected into the liquid chamber.

11. The method for manufacturing a vibration damping device according to claim 8,
    wherein before the vibration damping device main body is disposed inside the decompression container, the liquid is partially injected into the liquid chamber.

12. The method for manufacturing a vibration damping device according to claim 1,
    wherein before the vibration damping device main body is disposed inside the decompression container, the liquid is partially injected into the liquid chamber.

13. The method for manufacturing a vibration damping device according to claim 1,
    wherein the inside of the liquid accommodation portion directly communicates with the inside of the decompression container.

* * * * *